United States Patent
Deivasigamani et al.

(10) Patent No.: US 10,132,507 B2
(45) Date of Patent: Nov. 20, 2018

(54) COMBINED HOT WATER AND AIR HEATING AND CONDITIONING SYSTEM INCLUDING HEAT PUMP

(71) Applicants: INTELLIHOT GREEN TECHNOLOGIES, INC., Galesburg, IL (US); Sridhar Deivasigamani, Peoria, IL (US); Sivaprasad Akasam, Dunlap, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

(*) Notice: Subject to any disclaimer, the term of this patent is extended or adjusted under 35 U.S.C. 154(b) by 171 days.

(21) Appl. No.: 15/502,655

(22) PCT Filed: Aug. 20, 2015

(86) PCT No.: PCT/US2015/046186
§ 371 (c)(1),
(2) Date: Feb. 8, 2017

(87) PCT Pub. No.: WO2016/029067
PCT Pub. Date: Feb. 25, 2016

(65) Prior Publication Data
US 2017/0234550 A1      Aug. 17, 2017

Related U.S. Application Data

(60) Provisional application No. 62/039,894, filed on Aug. 20, 2014.

(51) Int. Cl.
*F24D 5/12*      (2006.01)
*F24D 12/02*     (2006.01)
(Continued)

(52) U.S. Cl.
CPC .............. *F24D 5/12* (2013.01); *F24D 12/02* (2013.01); *F24D 17/0026* (2013.01);
(Continued)

(58) Field of Classification Search
CPC ........ F24D 3/08; F24D 3/082; F24D 19/1069; F24D 19/0092; F24D 2220/044;
(Continued)

(56) References Cited

U.S. PATENT DOCUMENTS 5,097,801 A    3/1992  Burns
8,091,514 B2   1/2012  Jimenez
(Continued)

OTHER PUBLICATIONS

PCT/US15/46186 The International Search Report.
PCT/US15/46186 International Preliminary Report on Patentability.

*Primary Examiner* — Gregory Huson
*Assistant Examiner* — Daniel E Namay
(74) *Attorney, Agent, or Firm* — Tracy Jong Law Firm; Tracy P. Jong; Cheng Ning Jong

(57) ABSTRACT

A combined hot water and air heating and conditioning system including a first heat exchanger, a heat pump, a chilling tower loop, a burner and a second heat exchanger to provide hot water, air heating and air cooling. The system provides hot water, air heating and cooling all in one single unit. The system utilizes a heat pump to remove heat from ambient air and transfer the rejected heat into a hot water system, thereby using waste heat to heat the hot water system. The system utilizes a heat exchanger not only for the purpose of transferring heat from a heating source to a fluid in the heat exchanger but also for the purpose of dissipating heat from the fluid in the heat exchanger to the surroundings of the heat exchanger, thereby allowing a heat pump to act both as an air heating and conditioning device.

8 Claims, 8 Drawing Sheets

(51) Int. Cl.
*F24D 17/02* (2006.01)
*F24D 17/00* (2006.01)
*F24D 19/00* (2006.01)
*F24F 5/00* (2006.01)
*F24H 1/44* (2006.01)
*F24H 8/00* (2006.01)
*F28D 21/00* (2006.01)
*F23J 15/06* (2006.01)

(52) U.S. Cl.
CPC ..... *F24D 17/0052* (2013.01); *F24D 17/0078* (2013.01); *F24D 17/02* (2013.01); *F24D 19/0092* (2013.01); *F24F 5/0096* (2013.01); *F24H 1/445* (2013.01); *F24H 8/00* (2013.01); *F28D 21/0003* (2013.01); *F23J 15/06* (2013.01); *F24D 2200/04* (2013.01); *F24D 2200/123* (2013.01); *F24D 2200/18* (2013.01); *F24D 2200/32* (2013.01)

(58) Field of Classification Search
CPC ........... F24D 2220/042; F24D 2220/04; F24D 2220/123; F24D 2220/18; F24D 2220/32; F24D 5/12; F24D 12/02; F24D 17/0026; F24D 17/0052; F24D 17/0078; F24D 17/02; F24D 21/0003; F24H 1/445; F24H 1/125; F24H 1/08; F24H 1/122; F24H 1/48; F24H 1/50; F24H 1/52; F24H 8/00; F24F 5/0096; F23J 15/06

USPC ...... 237/2 A, 8 D, 8 A, 63, 61, 8 C, 19, 2 B; 122/13.01–19.1; 165/81, 183, 184
See application file for complete search history.

(56) References Cited

U.S. PATENT DOCUMENTS

| | | | |
|---|---|---|---|
| 2008/0184724 A1* | 8/2008 | Jagusztyn | F24D 17/02 62/238.6 |
| 2010/0319378 A1* | 12/2010 | Chikami | F24D 3/082 62/238.7 |
| 2011/0283726 A1* | 11/2011 | Sim | F24D 3/18 62/160 |
| 2011/0314848 A1* | 12/2011 | Tanaka | F25B 13/00 62/126 |
| 2012/0036876 A1* | 2/2012 | Honda | F24D 11/0214 62/132 |
| 2012/0043390 A1* | 2/2012 | Noh | F24D 3/08 237/2 A |
| 2012/0091214 A1* | 4/2012 | Rixen | F23N 3/08 237/5 |
| 2014/0229022 A1* | 8/2014 | Deivasigamani | G05D 7/0629 700/282 |
| 2014/0260358 A1* | 9/2014 | Leete | F25B 29/003 62/79 |
| 2015/0204550 A1* | 7/2015 | Deivasigamani | F24D 19/1069 237/2 A |
| 2016/0320075 A1* | 11/2016 | Deivasigamani | F24D 19/1066 |

* cited by examiner

WHEN OUTSIDE WEATHER IS BETWEEN 40 °F – 60 °F

WHEN OUTSIDE WEATHER IS LESS THAN 40 °F

SUMMER – POSSIBLE ENERGY TRAJECTORIES WITHOUT DOMESTIC WATER CONSUMPTION

With WEC

With Recirculation Only

WITH DOMESTIC WATER CONSUMPTION

COMBINED HOT WATER AND AIR HEATING AND CONDITIONING SYSTEM INCLUDING HEAT PUMP

PRIORITY CLAIM AND RELATED APPLICATIONS

This application claims the benefit of priority from provisional application U.S. Ser. No. 62/039,894 filed on Aug. 20, 2014 and PCT/US15/46186 filed on Aug. 20, 2015. Each of said applications is incorporated by reference in its entirety.

BACKGROUND OF THE INVENTION

1. The Field of the Invention

The present invention is directed generally to a combined hot water, air heating and conditioning system. More specifically, the present invention is directed to a combined hot water, air heating and conditioning system including a heat pump.

2. Background Art

Conventional hot water, air heating and cooling devices come in discrete units. There lacks synergistic heat transfer between these devices. For instance, the heat energy rejected by one device is not absorbed and taken advantage of by another device, but lost or transferred to the surroundings. When heat is required, it is again made available via combustion of oil, gas or consumption of electricity, etc.

Attempts have been made to capture waste heat from one system to be used in another or capture waste heat from one part of a system to be used in another part of the system. U.S. Pat. No. 5,097,801 to Burns (hereinafter Burns) discloses a waste energy hot water heater which extracts heat energy through heat exchange with flue gas from a primary heating device. The water heater has an easily removable, compact, and simple heat exchanger and a flue gas bypass system to avoid overheating the heat exchanger. U.S. Pat. No. 8,091,514 to Jimenez (hereinafter Jimenez) discloses an energy re-claimer for preheating water prior to the water entering a conventional residential, commercial or industrial gas water heater. The energy re-claimer is mounted on top of the water heater between the draft diverter and the hot air flue. The energy re-claimer is a double wall construction that is larger in diameter than the draft diverter and hot air flue in order to allow normal passage of hot air through the system. Tap water enters a pipe inside the double wall construction and is heated prior to being directed through the water heater. The pipe may be constructed of a number of straight lengths connected by returns or may be in the form of a single straight section connected to a coil made of connected curving sections that surround the axis of the energy re-claimer. A condensation collector may be provided between the draft diverter and the energy re-claimer to collect any condensation that may form as a result of cooling gases and prevent the condensate from falling into the water heater where it could extinguish the flame. Both Burns and Jimenez disclose reclaiming energy that would otherwise be waste heat in a heating system. None of them discloses a combined hot water and air heating and cooling system which takes advantage of one or more heat pumps.

Thus, there is a need for a combined hot water and air heating and cooling system capable of harnessing and taking advantage of the energy rejected from one process such that the need for heat energy can be met via transfer of energy as a result of an operation that already is occurring, e.g., in cooling, etc.

SUMMARY OF THE INVENTION

Disclosed herein is a combined hot water and air heating and conditioning system including:
(a) a first heat exchanger 6 including an inlet adapted to receive at least one of a fluid supply 80 and a recirculation flow 82, an outlet adapted to provide at least one of an output flow and the recirculation flow 82 and a first fluid mover 12 adapted to push the output flow and the recirculation flow 82;
(b) a heat pump 4 including an evaporator 22, a condenser 62 and a blower 24 configured to draw air surrounding the evaporator 22 and impinges the air upon the evaporator 22;
(c) a chilling tower loop 60 having a first end configured for heat transfer with the condenser 62, a second end, a fluid conductor connecting the first end and the second end, a second fluid mover 30 configured to push a fluid through the fluid conductor, wherein the second end including a heat transfer coil 18, a first flow path 50 configured to flow through the heat transfer coil 18 and a second flow path 84 configured to flow over at least one of the heat transfer coil 18 and the first heat exchanger 6, a catch basin 14 for receiving the flow of the second flow path 84 and a chilling tower blower 58 adapted to increase heat transfer between at least one of the first flow path 50 and the second flow path 84 and the surroundings of the at least one of the first flow path 50 and the second flow path 84 and heat transfer between the at least of one of the first flow path 50 and the second flow path 84 and the first heat exchanger 6;
(d) a heating source 44 adapted to heat at least one of the fluid supply 80 and the recirculation flow 82 within the first heat exchanger 6; and
(e) a second heat exchanger 26 adapted to cause heat transfer between the fluid of the fluid conductor and one of the fluid supply 80 and the recirculation flow 82,
whereby if water heating is desired, at least one of:
the heating source 44 is turned on and the first fluid mover 12 is turned on,
wherein acidic condensate is formed on outer surfaces of the first heat exchanger 6 and the heat transfer coil 18 such that the outer surfaces are descaled; and
the heating source 44 is turned off, the second fluid mover 30 is turned on, the first fluid mover 12 is turned on and the heat pump 4 is turned on;
If air heating is desired, at least one of:
the heating source 44 is turned on, the first fluid mover 12 is turned on, the
second fluid mover 30 is turned on and the heat pump 4 is turned on; and
the heating source 44 is turned off, the first fluid mover 12 is turned on, the second fluid mover 30 is turned on, the heat pump 4 is turned on and the chilling tower blower 58 is turned on;
if air cooling is desired, at least one of:
the heating source 44 is turned off, the second fluid mover 30 is turned on, the heat pump 4 is turned on, and at least one of the first flow path 50 and the second flow path 84 is selected;
the heating source 44 is turned off, the second fluid mover 30 is turned on, the heat pump 4 is turned on, the first fluid mover 12 is turned on and at least one of the first flow path 50 and the second flow path 84 is selected; and the heating source 44 is turned off, the second fluid mover 30 is turned on, the heat pump 4 is turned on, the first fluid mover 12 is turned on, the chilling tower blower 58 is turned on and at least one of the first flow path 50 and the second flow path 84 is selected.

In one embodiment, the second heat exchanger 26 is a plate-type heat exchanger.

In one embodiment, the chilling tower loop 60 further comprises a third flow path 54 configured for connecting the chilling tower loop 60 to the inlet of the first heat exchanger 6.

In one embodiment, the catch basin 14 further includes an inducer fan 76 adapted to enhance evaporation of a flow of the second flow path 84 in the catch basin 14.

An object of the present invention is to provide a combined system capable of providing hot water, air heating and air cooling as a single unit and therefore does not require multiple devices, each serving one or more functions simultaneously, e.g., water heating, air heating and air cooling.

Another object of the present invention is to provide a comfort device capable of bi-directional heat transfer and hence capable of efficient heating of water and air and cooling of air.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—combined hot water, air heating and conditioning system
    4—heat pump
    6—coil heat exchanger (HEX)
    8—check valve
    10—shower head
    12—fluid mover or pump
    14—catch basin
    16—buffer tank
    18—heat transfer coil
    20—wall
    22—evaporator
    24—blower
    26—plate type heat exchanger (PTHE)
    28—incoming water manifold
    30—fluid mover or pump
    32—collection of drips
    34—valve
    36—valve
    38—inlet fitting
    40—outlet fitting
    42—point of use
    44—burner
    46—inlet
    48—outlet
    50—first flow path
    52—four way valve
    54—third flow path
    56—recirculation flow path
    58—chilling tower blower
    60—chilling tower loop
    62—condenser
    64—thermostatic valve
    66—potential calcium deposit
    68—flue gas or cooling air
    70—drain valve
    72—expansion valve
    74—compressor
    76—inducer fan
    78—chilling tower or water evaporative condenser (WEC)
    80—fluid supply
    82—recirculation flow
    84—second flow path

PARTICULAR ADVANTAGES OF THE INVENTION

The present combined system provides hot water, air heating and cooling all in one single unit. The present combined system utilizes a heat pump to remove heat from the ambient air and add heat into a hot water system, transferring the rejected heat to the hot water system, thereby using waste heat to heat the hot water system. The present combined system utilizes a heat exchanger not only for the purpose of transferring heat from a heating source, e.g., burner to a fluid in the heat exchanger but also for the purpose of dissipating heat from the fluid in the heat exchanger to the surroundings of the heat exchanger, thereby allowing a heat pump to act both as an air heating device and air conditioning device.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
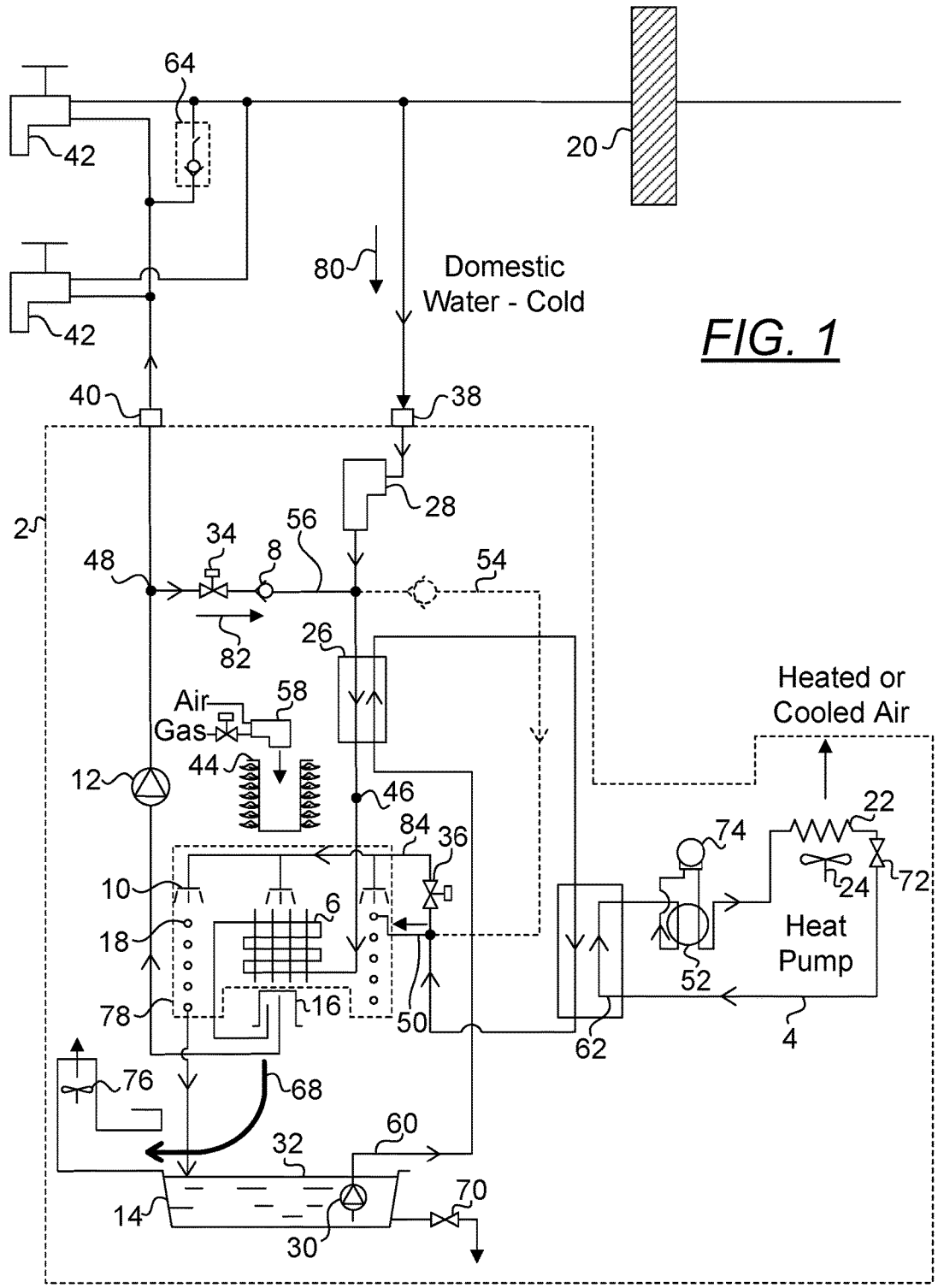
FIG. 1 is a diagram depicting one embodiment of the present combined hot water, air heating and conditioning system.
Figure 2:
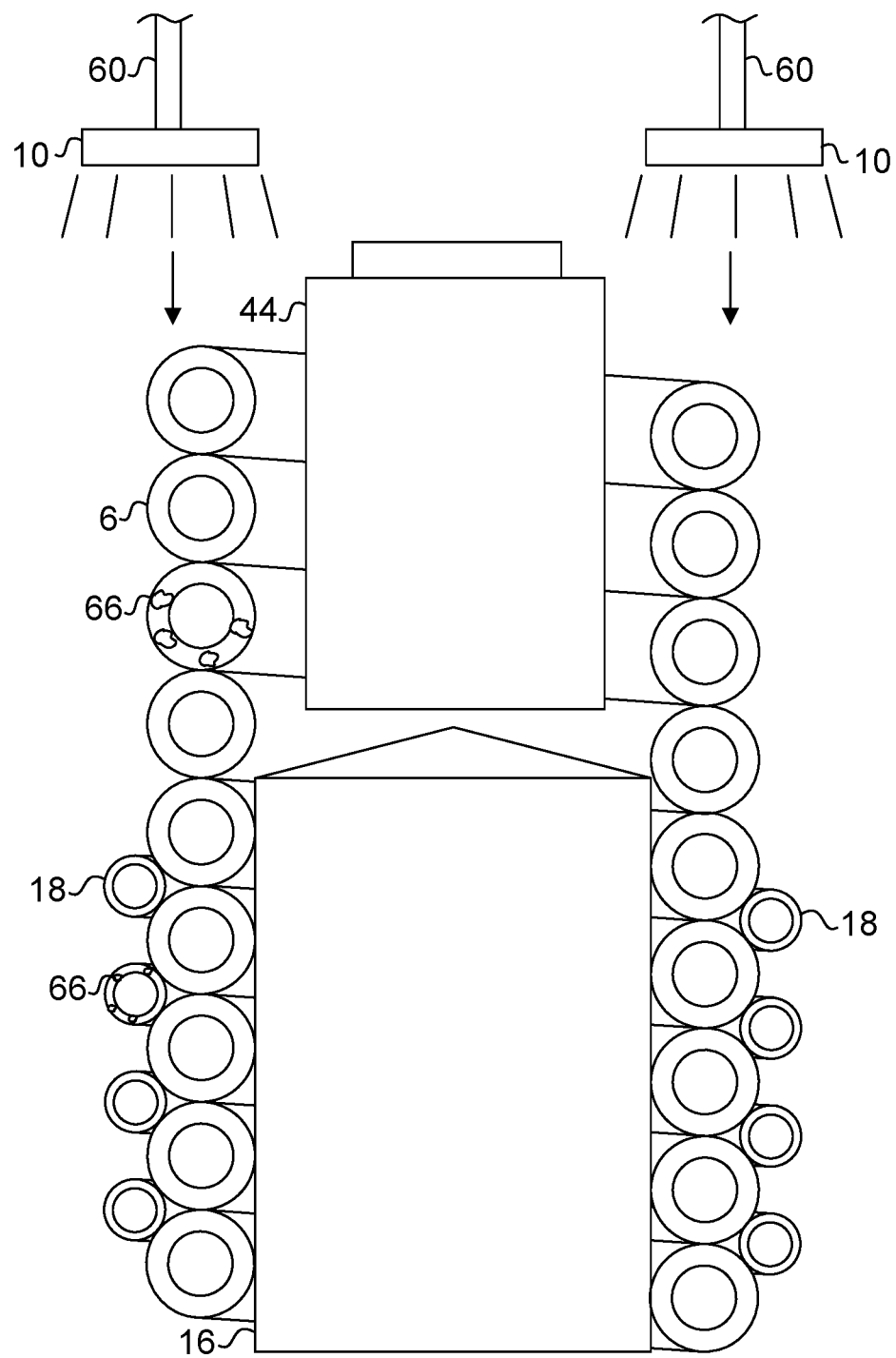
FIG. 2 is a diagram depicting one embodiment of a chilling tower of the present combined hot water, air heating and conditioning system.

FIG. 1 is a diagram depicting one embodiment of the present combined hot water, air heating and conditioning system. The combined hot water and air heating and conditioning system 2 includes a first heat exchanger 6, a heat pump 4, a chilling tower loop 60, a heating source or burner 44 and a second heat exchanger 26. In this example, the combined hot water and air heating and conditioning system 2 is shown providing hot water to two points 42 of use through the outlet fitting 40, drawing water supply entering through a building via a wall 20 and the combined system 2 via the inlet fitting 38 and provides heated or cooled air to a space. FIG. 2 is a diagram depicting one embodiment of a chilling tower of the present system.

The first heat exchanger 6 includes an inlet 46 adapted to receive either an input flow or a recirculation flow, an outlet 48 adapted to provide an output flow and the recirculation flow and a first fluid mover 12 adapted to push the input flow and the recirculation flow. The heat pump 4 including an evaporator 22, a condenser 62, a blower 24 configured to draw air surrounding said evaporator 22 and impinges the air upon said evaporator 22.

The chilling tower loop 60 essentially includes a chilling tower including a first end configured to receive heat rejected from the condenser 62, a second end, a fluid conductor connecting the first end and the second end, a second fluid mover 30 configured to push a fluid through the fluid conductor. The second end includes a heat transfer coil 18, a first flow path 50 configured to flow through the heat transfer coil 18 and a second flow path 84 configured to flow over and evaporates from exterior surfaces of at least the heat transfer coil 18 if not also the heat exchanger 6, a catch basin 14 for receiving the flow through the second flow path 84 and a chilling tower blower 58 adapted to increase dissipation of heat from the first flow path 50 and the second flow path 84 and transfer of heat between either one or both the first flow path 50 and the second flow path 84 to the first heat exchanger 6. Referring to FIG. 2, in order to dissipate heat from the flow of the chilling tower loop 60, the flow is configured to exit via one or more shower heads 10 as a shower over exterior surfaces of the heat exchanger 6 and coil 18. In another embodiment, coil 18 is not disposed in close proximity with the heat exchanger 6. The shower exiting the chilling tower loop 60 is configured to flow over either coil 18 or the heat exchanger 6 but not both. Referring again to FIG. 2, in one embodiment, as the heat exchanger 6 is coupled with the heat transfer coil 18, the flow through the chilling tower loop 60 cannot be enabled when the burner 44 is in use. The burner 44 is adapted to heat a water flow within the first heat exchanger 6 and/or coil 18. In one embodiment, the heat exchanger 6 further includes a buffer tank 16 configured for operably receiving the flow through the heat exchanger 6 and holding a small amount of water to aid in reducing delay in providing hot water when it is requested.

The second heat exchanger 26 is adapted to cause heat transfer between the fluid of the fluid conductor and unheated flow of domestic cold water supply 80 and recirculation flow 82 of path 56. In one embodiment, the second heat exchanger 26 is a plate-type heat exchanger. In one embodiment, the chilling tower loop 60 further includes a third flow path 54 configured for connecting the chilling tower loop 60 to the inlet of the first heat exchanger 6. If a third flow path 54 is available, there is preferably a valve for controlling the amount of flow through it such that the flow can be completely terminated or modulated. In another embodiment, a chilling tower blower 58 is adapted to increase heat transfer between the fluid flowing through the first flow path 50 and the second flow path 84 and heat transfer between the fluid flowing through either one or both of the first flow path 50 and the second flow path 84 to the first heat exchanger 6.

In one mode, if water heating is desired, e.g., when a demand exists at one or more points 42 of use, both the burner 44 and the first fluid mover 12 are turned on.

Incoming water is first drawn through inlet 46, receiving heat in the heat exchanger 6 from burner 44 and exiting to service one or more of the points 42 of use.

In another mode, if water heating is desired, both the second fluid mover 30 and the first fluid mover 12 are turned on and the heat pump 4 is turned on. In this mode, heat is first absorbed through the evaporator 22. The blower 24 increases the efficiency of heat transfer from the ambient air to the fluid flow within the heat pump 4. As the heated flow in the heat pump 4 arrives in the condenser 62, heat is rejected to the chilling tower loop 60. Heat gained in the chilling tower loop 60 is in turn rejected to the fluid flow within the heat exchanger 6 via heat transfer coil 18. Blower 24 therefore moves conditioned or chilled air to a space within which it is disposed while the fluid flowing through the heat exchanger 6 is being heated even with the burner kept off. The thermally spent fluid within the chilling tower loop 60 is now returned by pump 30 to continue to remove heat from the condenser 62. The use of pump 12 in this case serves to expose more fluid within the heat exchanger 6 fluid conductor to heated fluid in the chilling tower loop 60 fluid conductor to increase heat rejected into the fluid flowing within the heat exchanger 6. Additional heat is transferred from the return fluid in the chilling tower loop 60 to the fluid within the heat exchanger 6 in the second heat exchanger 26.

In a conventional evaporative process of water, calcium is potentially left behind to form scales on fluid conductors or any parts exposed to the water. During the present water heating process, calcium 66 that can potentially be deposited on the fins of the main heat exchanger 6 or heat transfer coil 18 during evaporation will be washed away or dissolved by the acidic condensate (sulfuric acid ($H_2SO_4$), nitric acid ($HNO_3$), etc.) that is formed when the unit runs in the water heating mode, i.e., with the burner 44 turned on to create flue gas. Therefore self-descaling occurs and removes the need for additional descaling mechanisms.

In one mode, if air heating is desired, the burner 44, the first fluid mover 12 and the second fluid mover 30 and the heat pump 4 are turned on. The heat pump 4 is said to be turned on when the blower 24 and compressor 74 are turned on. Heat is added to the fluid flow within the heat exchanger 6 fluid conductor and removed by the chilling tower loop 60 while the fluid flow within the heat exchanger 6 flows through the second heat exchanger 26. Heat is subsequently transferred to the heat pump 4 at the condenser 62. As the heated fluid in the heat pump 4 flows through the evaporator 22, heat is rejected to its surroundings. This process is aided by the blower 24 which causes air to impinge upon the outer surfaces of evaporator 22 and removes heat from the fluid flow within the heat pump 4 and releasing it into the space being heated.

In another mode, if air heating is desired, the burner 44 is turned off, the first fluid mover 12, the second fluid mover 30, the chilling tower blower 58 and the heat pump are turned on. Heat is absorbed by the fluid flowing within the heat exchanger 6 and the fluid flowing within the heat transfer coil 18 from the air flowing over the heat exchanger 6 and the heat transfer coil 18, respectively, and eventually rejected at evaporator 22.

In one mode, if air cooling is desired, the burner 44 is turned off, the second fluid mover 30 and the blower 24 of the heat pump 4 are turned on, and at least one of the first flow path 50 and the second flow path 84 is selected. The heat absorbed by the fluid flowing through the heat pump 4 is transferred to the chilling tower loop 60 and dissipated through at least one of the first flow path 50 and the second flow path 84 to its surroundings and the fluid flowing in the first heat exchanger 6. Note that, in contrast to the mode of heat transfer in water heating in which heat is transferred from the surroundings of the first heat exchanger 6 to the fluid within it, heat is rejected from the fluid in the first heat exchanger 6 in this mode to its surroundings. Therefore, the first heat exchanger 6 allows bi-directional heat transfer between the environment surrounding it and the fluid in the first heat exchanger 6. In another mode, the first fluid mover 12 is also turned on to move fluid through the heat exchanger 6, further increasing heat rejection into the fluid of the heat exchanger 6. In one embodiment, in order to enhance heat rejection from the chilling tower, an inducer fan 76 is further provided to lower pressure surrounding the collection of drips 32 such that evaporation, which removes heat from such collection can be enhanced. A drain valve 70 facilitates draining of the catch basin 14 during its service. In one embodiment, the fluid used in the heat pump includes refrigerant r32A.

Figure 3:
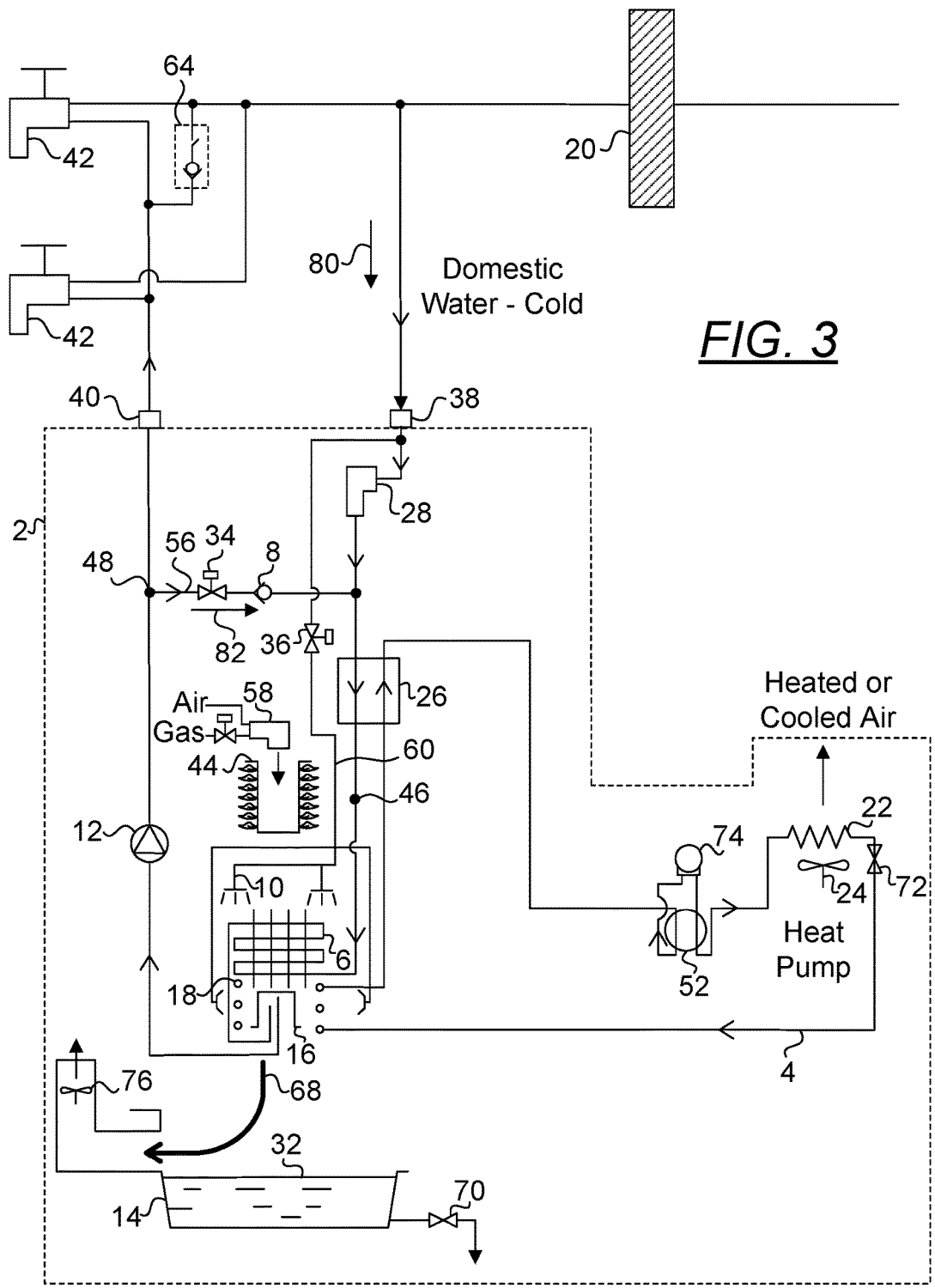
FIG. 3 is a diagram depicting another embodiment of the present combined hot water, air heating and conditioning system.
Figure 3A:
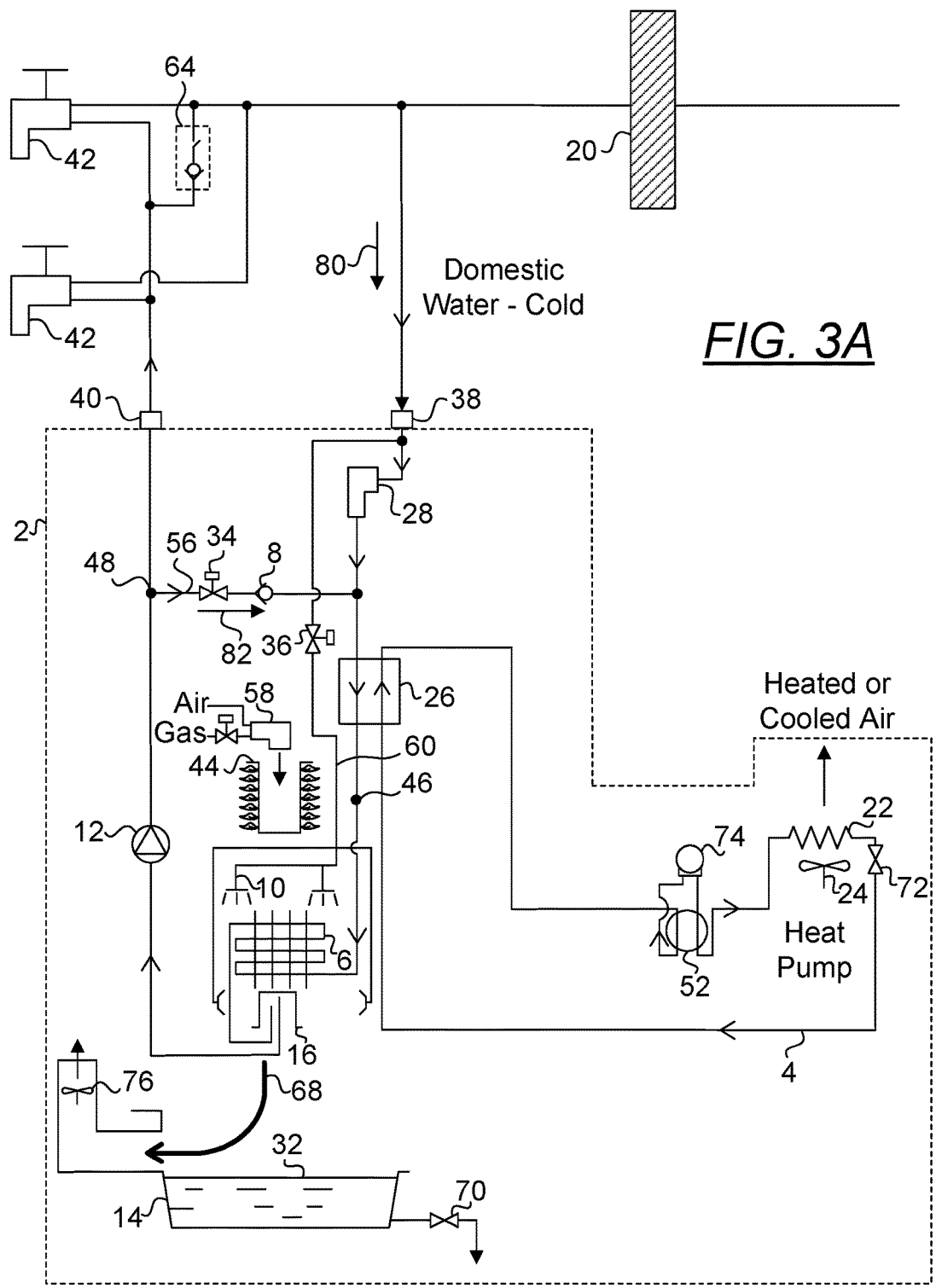
FIG. 3A is a diagram depicting another embodiment of the present combined hot water, air heating and conditioning system.

FIGS. 4-10 depict example operations, where applicable, of FIG. 3 or FIG. 3A. FIG. 3 is a diagram depicting another embodiment of the present combined hot water, air heating and conditioning system. The combined hot water and air heating and conditioning system 2 includes a first heat exchanger 6, a heat pump 4, a burner 44, a second heat exchanger 26 and an open loop chilling tower. In this example, the combined hot water and air heating and conditioning system 2 is shown providing hot water to two points 42 of use through the outlet fitting 40, drawing water supply entering through a building via a wall 20 and the combined system 2 via the inlet fitting 38 and provides heated or cooled air to a space. The chilling tower is essentially an open loop system selectively receiving cooling water from a domestic water supply. Valve 36 controls the amount of cold water that is allowed to flow over the first heat exchanger 6 and the heat transfer coil 18. Any overflow may be collected in the catch basin 14. As the collection 32 of drips is not recycled, a chilling tower loop, such as one disclosed in FIG. 1 is unnecessary, thereby simplifying the design of this combined system. The heat pump 4 is connected directly to the heat transfer coil 18. An incoming water manifold 28 which includes, among other devices, a flowmeter adapted to record the flowrate of the incoming water flow, a temperature sensor adapted to record the temperature of the incoming water flow, is provided. FIG. 3A is a diagram depicting another embodiment of the present combined hot water, air heating and conditioning system. It shall be noted that FIG. 3A essentially includes all components depicted in FIG. 3 with the exception that the heat transfer coil 18 of FIG. 3 is not used.

Figure 4:
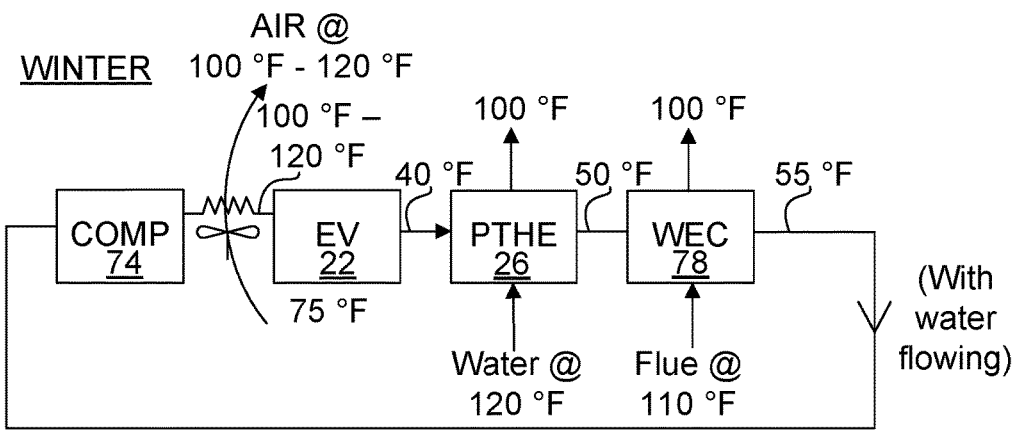
FIG. 4 is a block diagram depicting an example air heating operation of the present system in the winter.

FIG. 4 is a block diagram depicting an example air heating operation of the present system in the winter. Upon compression by compressor 74, the refrigerant temperature of the heat pump is elevated to a temperature from about to about 120 degrees F. Recirculated air at 75 degrees F. is heated to a temperature of from about 100 degrees F. which is moved with the aid of blower 24 to a space being heated. Upon heat transfer at the evaporator 22, the refrigerant temperature drops to about 40 degrees F. Heat is re-added to the refrigerant via the plate type heat exchanger 26 by water at about 120 degrees F. in the hot water loop to about 50 degrees F. The water temperature in the hot water loop drops to about 100 degrees F. Heat is also re-added to the refrigerant via the chilling tower or water evaporative condenser 78 by flue gas 68 at about 110 degrees F. to about 55 degrees F. In a system having a water evaporative condenser, a chilling tower or water evaporative condenser 78 includes a heat transfer coil 18, a coil heat exchanger 6 and one or more shower heads 10. In a system without a water evaporative condenser, a chilling tower or water evaporative condenser 78 includes only a coil heat exchanger 6 and one or more shower heads 10. The flue gas 68 temperature drops to about 100 degrees F. The refrigerant temperature of 55 degrees F. is again raised to about 100 degrees F. upon compression by compressor 74 and ready for heat transfer to the space being heated at the evaporator 22.

Figure 5:
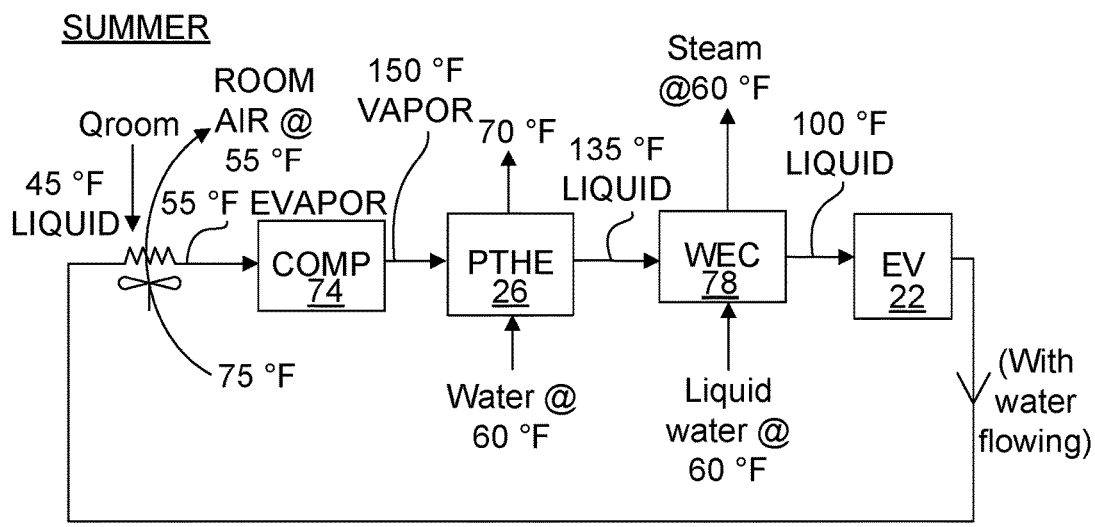
FIG. 5 is a block diagram depicting an example water heating operation of the present system in the summer.

FIG. 5 is a block diagram depicting an example water heating operation of the present system in the summer. Heat is absorbed from a space being cooled via the evaporator 22 by a refrigerant at about 45 degrees F. which subsequently becomes lo about 55 degrees F. Upon compression by the compressor 74, the refrigerant is heated to about 150 degrees F. At the plate type heat exchanger 26, heat is further transferred from the refrigerant to the incoming water, increasing the domestic water temperature from about 60 degrees F. to about 70 degrees F. While water flows over the heat transfer coil 18, incoming water of about 60 degrees F. receives heat from the refrigerant flowing in the heat pump 4 and evaporates at about 60 degrees F. Any excess flow not evaporated continues to its downward path and is collected in the catch basin 14. The inducer fan 76 further encourages evaporation by creating air flow over the drips 32 collected in the catch basin 14. As a result the refrigerant temperature is dropped to about 100 degrees F. The refrigerant temperature drops to about 80 degrees F. as a result. After passing through the evaporator 22, the refrigerant temperature drops further to about 45 degrees F. and ready again to remove heat from the space to be cooled.

Figure 6:
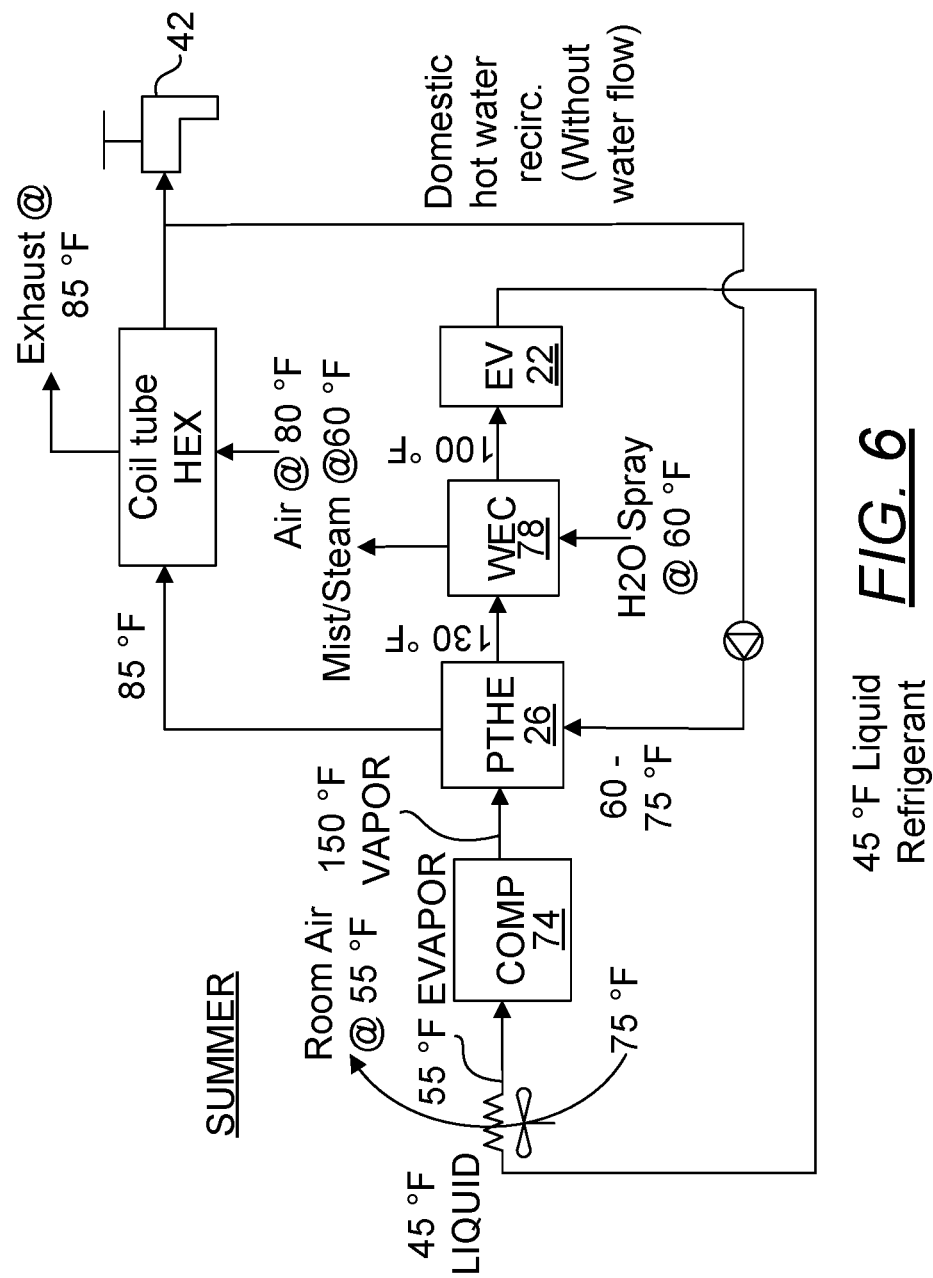
FIG. 6 is a block diagram depicting another example operation of the present system in the summer.

FIG. 6 is a block diagram depicting another example operation of the present system in the summer. In addition to cooling a space, the system provides a supply of hot water. In this case, heat is also absorbed from a space being cooled via the evaporator 22 by a refrigerant at about 45 degrees F. which subsequently becomes about 55 degrees F. Upon compression by the compressor 74, the refrigerant is heated to about 150 degrees F. Upon passing the plate type heat exchanger 26, the refrigerant temperature is further dropped to about 130 degrees F. The load required of the burner 44 is lessened as the incoming water may now be a recirculated water flow at an elevated temperature of up to about 75 degrees F. and the heat stored in the refrigerant will be rejected into the water flow via the plate type heat exchanger 26. As a result, the water flow into the heat exchanger 6 has a temperature that has been elevated to about 85 degrees F. While flowing over the heat transfer coil 18, incoming water of about 60 degrees F. receives heat from the refrigerant flowing in the heat pump 4 and also the flue gas of the burner and evaporates at about 60 degrees F. Any excess flow not evaporated continues to its downward path and is collected in the catch basin 14. The inducer fan 76 further encourages evaporation by creating air flow over the drips 32 collected in the catch basin 14. The intake air of the heat exchanger of about 80 degrees F. is output as flue gas at about 85 degrees F. Upon passing the evaporator 22, the refrigerant temperature drops further to about 45 degrees F.

Figure 7:
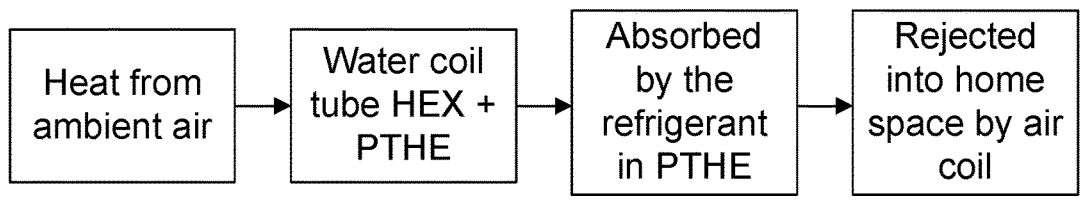
FIG. 7 is a block diagram depicting an example operation of the present system at a specific outside temperature condition.

FIG. 7 is a block diagram depicting an example operation of the present system at a specific outside temperature condition. When outdoor air temperature falls within the range of from about 40 degrees F. and 60 degrees F., heat from ambient air is transferred to the domestic water flow through the heat exchanger 6 by virtue of the air flow brought by the blower 58. The heat absorbed in the domestic water flow is then transferred via the plate type heat exchanger 26 to the refrigerant of the heat pump 4, which is then subsequently rejected into a space being heated via the evaporator 22, reducing the heating load required to heat the space using other means, e.g., the burner 44.

Figure 8:
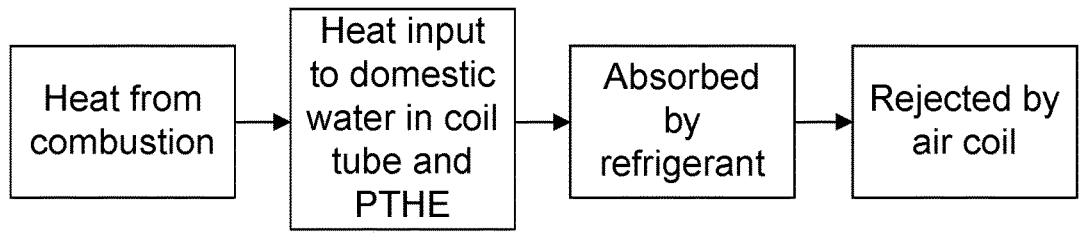
FIG. 8 is a block diagram depicting an example operation of the present system at another outside temperature condition.

FIG. 8 is a block diagram depicting an example operation of the present system at another outside temperature condition. When outdoor air temperature falls under about 40 degrees F., the burner 44 is turned on to add heat to the domestic water flow and subsequently the refrigerant of the heat pump. The absorbed heat of the refrigerant is subsequently rejected into a space being heated via the evaporator 22.

Figure 9:
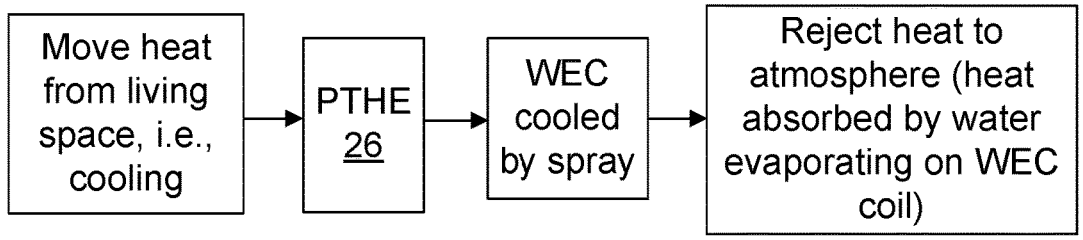
FIG. 9 is a block diagram depicting an example operation of the present system without domestic water flow.
Figure 9:
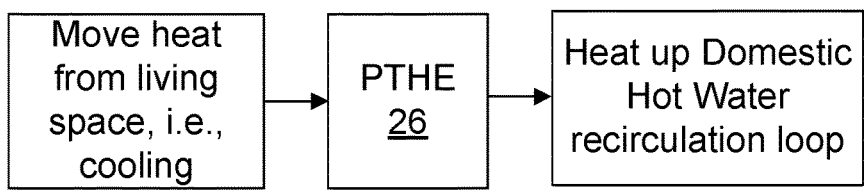

FIG. 9 is a block diagram depicting an example operation of the present system without domestic water consumption. In one embodiment, heat is first absorbed from the space to be cooled by the refrigerant of the plate type heat exchanger and subsequently rejected into the water spray evaporating from the water evaporative condenser 78. In another embodiment, a portion of the heat absorbed by the refrigerant from the space to be cooled is rejected via the plate type heat exchanger 26 into the domestic water even without a domestic water consumption and involves only recirculation.

Figure 10:
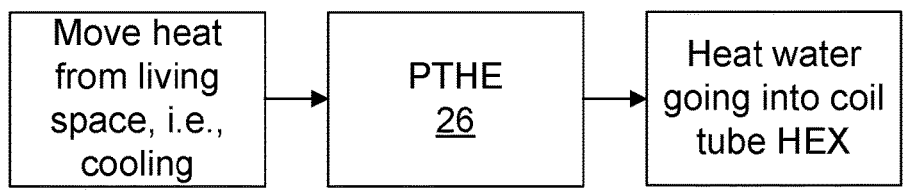
FIG. 10 is a block diagram depicting an example operation of the present system with domestic water flow.

FIG. 10 is a block diagram depicting an example operation of the present system with domestic water consumption. When the domestic water flow is effected, the heat absorbed by the refrigerant from the space to be cooled is rejected via the plate type heat exchanger into the domestic water flow.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A combined hot water and air heating and conditioning system (2) comprising:
    (a) a first heat exchanger (6) comprising an inlet adapted to receive at least one of a fluid supply (80) and a recirculation flow (82), an outlet adapted to provide at least one of an output flow and said recirculation flow (82) and a first fluid mover (12) adapted to push the output flow and the recirculation flow;
    (b) a heat pump (4) comprising an evaporator (22), a condenser (62), a blower (24) configured to draw air surrounding said evaporator (22) and impinges the air upon said evaporator (22);
    (c) a chilling tower loop (60) configured for selectively receiving a portion of said fluid supply (80) and a catch basin (14) configured for containing effluent of said chilling tower loop (60);
    (d) a chilling tower blower (58) adapted to increase heat transfer between at least one of said fluid supply (80) and said recirculation flow (82) within said first heat exchanger (6) and the surroundings of said first heat exchanger (6);
    (e) a heating source (44) adapted to heat at least one of said fluid supply (80) and said recirculation flow (82) within said first heat exchanger (6); and
    (f) a second heat exchanger (26) adapted to cause heat transfer between said condenser (62) and one of the fluid supply (80) and said recirculation flow (82), whereby if water heating is desired, at least one of:
    said heating source (44) is turned on and said first fluid mover (12) is turned on, wherein acidic condensate is formed on outer surfaces of said first heat exchanger (6) such that said outer surfaces are descaled; and
    said heating source (44) is turned off and said heat pump (4) is turned on;
    If air heating is desired, at least one of:
    said heating source (44) is turned on, said first fluid mover (12) is turned on and said heat pump (4) is turned on; and
    said heating source (44) is turned off, said first fluid mover (12) is turned on,
    said heat pump (4) is turned on and said chilling tower blower (58) is turned on;
    if air cooling is desired, at least one of:
    said heating source (44) is turned off, said heat pump (4) is turned on;
    said heating source (44) is turned off, said heat pump (4) is turned on and said first fluid mover (12) is turned on; and said heating source (44) is turned off, said heat pump (4) is turned on, said first fluid mover (12) is turned on and said chilling tower blower (58) is turned on.

2. The combined hot water and air heating and conditioning system (2) of claim 1, wherein said catch basin (14) further comprises an inducer fan (76) adapted to enhance evaporation of a flow collected in said catch basin (14) from said chilling tower loop (60).

3. A combined hot water and air heating and conditioning system (2) comprising:
 (a) a first heat exchanger (6) comprising an inlet adapted to receive at least one of a fluid supply (80) and a recirculation flow (82), an outlet adapted to provide at least one of an output flow and said recirculation flow and a first fluid mover (12) adapted to push the output flow and the recirculation flow;
 (b) a heat pump (4) comprising an evaporator (22), a condenser (62), a blower (24) configured to draw air surrounding said evaporator (22) and impinges the air upon said evaporator (22) and a heat transfer coil (18) connected to a location downstream from said evaporator (22);
 (c) a chilling tower loop (60) configured for selectively receiving a portion of said fluid supply (80) and a catch basin (14) configured for containing effluent of said chilling tower loop (60);
 (d) a chilling tower blower (58) adapted to increase heat transfer between at least one of said fluid supply (80) and said recirculation flow (82) within said first heat exchanger (6) and the surroundings of said first heat exchanger (6) and heat transfer between a fluid within said heat transfer coil (18) and the surroundings of said heat transfer coil (18);
 (e) a heating source (44) adapted to heat at least one of said fluid supply (80) and said recirculation flow (82) within said first heat exchanger (6) and said fluid within said heat transfer coil (18); and
 (f) a second heat exchanger (26) adapted to cause heat transfer between said condenser (62) and at least one of said fluid supply (80) and said recirculation flow (82),
 whereby if water heating is desired, at least one of:
  said heating source (44) is turned on and said first fluid mover (12) is turned on, wherein acidic condensate is formed on outer surfaces of said first heat exchanger (6) and said heat transfer coil (18) such that said outer surfaces are descaled; and
  said heating source (44) is turned off and said heat pump (4) is turned on;
 If air heating is desired, at least one of:
  said heating source (44) is turned on, said first fluid mover (12) is turned on and said heat pump (4) is turned on; and
  said heating source (44) is turned off, said first fluid mover (12) is turned on, said heat pump (4) is turned on and said chilling tower blower (58) is turned on;
 if air cooling is desired, at least one of:
  said heating source (44) is turned off, said heat pump (4) is turned on;
  said heating source (44) is turned off, said heat pump (4) is turned on and said first fluid mover (12) is turned on; and
  said heating source (44) is turned off, said heat pump (4) is turned on, said first fluid mover (12) is turned on and said chilling tower blower (58) is turned on.

4. The combined hot water and air heating and conditioning system (2) of claim 3, wherein said catch basin (14) further comprises an inducer fan (76) adapted to enhance evaporation of a flow collected in said catch basin (14) from said chilling tower loop (60).

5. A combined hot water and air heating and conditioning system (2) comprising:
 (a) a first heat exchanger (6) comprising an inlet adapted to receive at least one of a fluid supply (80) and a recirculation flow (82), an outlet adapted to provide one of an output flow and said recirculation flow (82) and a first fluid mover (12) adapted to push said output flow and said recirculation flow (82);
 (b) a heat pump (4) comprising an evaporator (22), a condenser (62) and a blower (24) configured to draw air surrounding said evaporator (22) and impinges the air upon said evaporator (22);
 (c) a chilling tower loop (60) having a first end configured for heat transfer with said condenser (62), a second end, a fluid conductor connecting said first end and said second end, a second fluid mover (30) configured to push a fluid through said fluid conductor, wherein said second end comprising a heat transfer coil (18), a first flow path (50) configured to contain flow through said heat transfer coil (18) and a second flow path (84) configured to contain flow over at least one of said heat transfer coil (18) and said first heat exchanger (6), a catch basin (14) for receiving the flow through said second flow path (84) and a chilling tower blower (58) adapted to increase heat transfer between at least one of said first flow path (50) and said second flow path (84) and the surroundings of said at least one of said first flow path (50) and said second flow path (84) and heat transfer between the surroundings of said first heat exchanger (6) and said at least one of said fluid supply (80) and said recirculation flow (82);
 (d) a heating source (44) adapted to heat at least one of said fluid supply (80) and said recirculation flow (82) within said first heat exchanger (6); and
 (e) a second heat exchanger (26) adapted to cause heat transfer between the fluid of said fluid conductor and one of the fluid supply (80) and said recirculation flow (82),
 whereby if water heating is desired, at least one of:
  said heating source (44) is turned on and said first fluid mover (12) is turned on, wherein acidic condensate is formed on outer surfaces of said first heat exchanger (6) and said heat transfer coil (18) such that said outer surfaces are descaled; and
  said heating source (44) is turned off, said second fluid mover (30) is turned on, said first fluid mover (12) is turned on and said heat pump (4) is turned on;
 If air heating is desired, at least one of:
  said heating source (44) is turned on, said first fluid mover (12) is turned on, said second fluid mover (30) is turned on and said heat pump (4) is turned on; and
  said heating source (44) is turned off, said first fluid mover (12) is turned on,
  said second fluid mover (30) is turned on, said heat pump (4) is turned on and
  said chilling tower blower (58) is turned on;
 if air cooling is desired, at least one of:
  said heating source (44) is turned off, said second fluid mover (30) is turned on, said heat pump (4) is turned on, and at least one of said first flow path (50) and said second flow path (84) is selected;
  said heating source (44) is turned off, said second fluid mover (30) is turned on, said heat pump (4) is turned on, said first fluid mover (12) is turned on and at least one of said first flow path (50) and said second flow path (84) is selected; and said heating source (44) is turned off, said second fluid mover (30) is turned on, said heat pump (4) is turned on, said first fluid mover (12) is turned on, said chilling tower blower (58) is turned on and at least one of said first flow path (50) and said second flow path (84) is selected.

6. The combined hot water and air heating and conditioning system of claim 5, wherein said second heat exchanger (26) is a plate-type heat exchanger.

7. The combined hot water and air heating and conditioning system of claim 5, wherein said chilling tower loop (60) further comprises a third flow path (54) configured for connecting said chilling tower loop (60) to said inlet of said first heat exchanger (6).

8. The combined hot water and air heating and conditioning system of claim 5, wherein said catch basin (14) further comprises an inducer fan (76) adapted to enhance evaporation of a flow collected in said catch basin (14) from said chilling tower loop (60).

\* \* \* \* \*